INVENTOR.
ROBERT S. BLACKBURN
BY Robert O. Richardson
- ATTORNEY -

INVENTOR.
ROBERT S. BLACKBURN
BY Robert O. Richardson
-ATTORNEY-

United States Patent Office 3,442,487
Patented May 6, 1969

3,442,487
VALVE WITH ISOLATED VALVE ACTUATING MECHANISM
Robert S. Blackburn, Huntington Beach, Calif., assignor, by mesne assignments, to McDonnell Douglas Corporation, Santa Monica, Calif., a corporation of Maryland
Filed Oct. 24, 1965, Ser. No. 504,843
Int. Cl. F16k *31/44, 1/32*
U.S. Cl. 251—257          6 Claims

ABSTRACT OF THE DISCLOSURE

A valve actuating mechanism isolated from the valve fluid flow chamber that is controlled by the valve.

---

Valves control the flow of fluids through fluid conductors. Most valves require a stem or push rod to enter into the flow chamber from the outside of the valve housing. The valve stem rotates or moves longitudinally into and out of the housing to cause or preent fluid flow as desired. A seal fits around this stem to provide it with a fluid tight connection. However, during the use and under pressure, this is a potential leakage path from the fluid chamber to the outside of the valve housing. Many valve problems are produced by the valve stem actuating mechanism, yet the valve must be removed from the fluid path in order to repair such malfunction. In use, it may be desirable to change the actuating force in the operation of the valve, such as from a hand attachment to a remotely controlled solenoid. In these existing valves the transformation cannot be done without first breaking into the fluid path and exposing the fluid within the fluid line that is controlled by the valve.

In the passage of fluids under pressure and in the passage of fluids of a highly combustible or other hazardous nature, the valve design for the control of the passage of such fluids in the system should provide the best leak tight system possible. The design of the present valve eliminates the leakage problems caused by the use of valve opertaing devices that protrude into the fluid path.

It is therefore an object of the present invention to provide for a valve in which the control rod does not enter the fluid flow system and around which seals are not needed to prevent the escape of the fluid from the system.

Another object is the provision of a valve wherein the valve control device is isolated from the fluid flow system and accordingly the removal, replacement or alteration of the valve control device can be accomplished without breaking into the fluid flow system.

Another object is the provision of a valve to be powered by external sources wherein the sources may be interchangeable without breaking into the fluid flow system.

Figure 1:
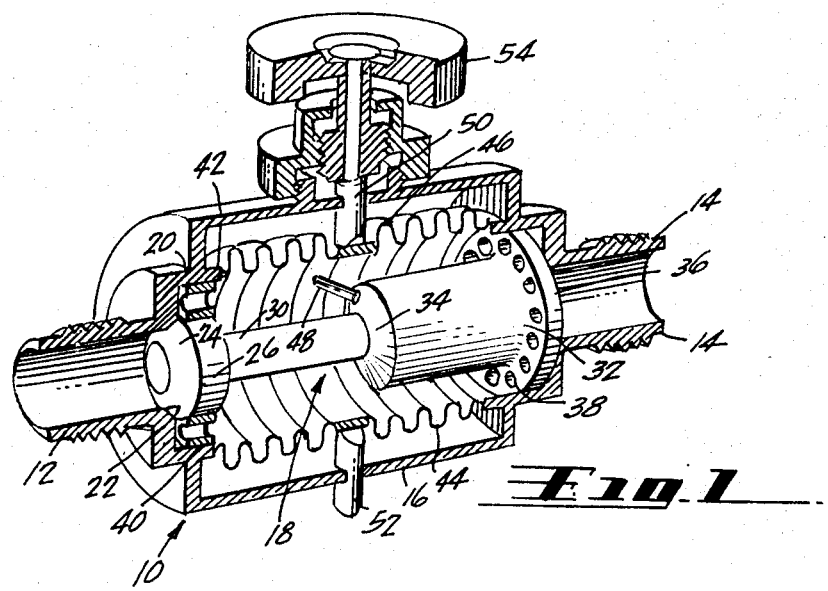
Figure 2:
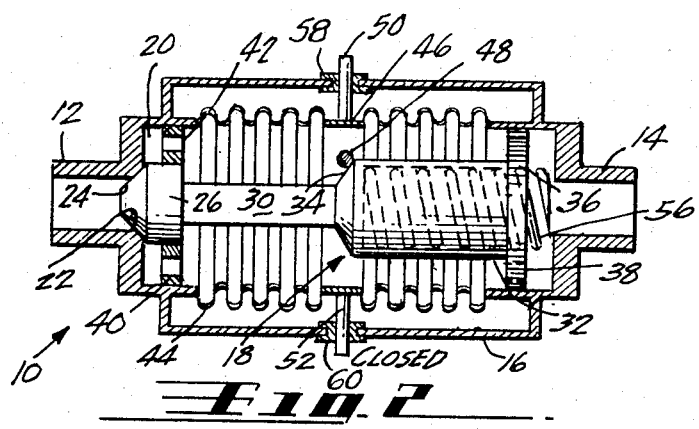
Figure 3:
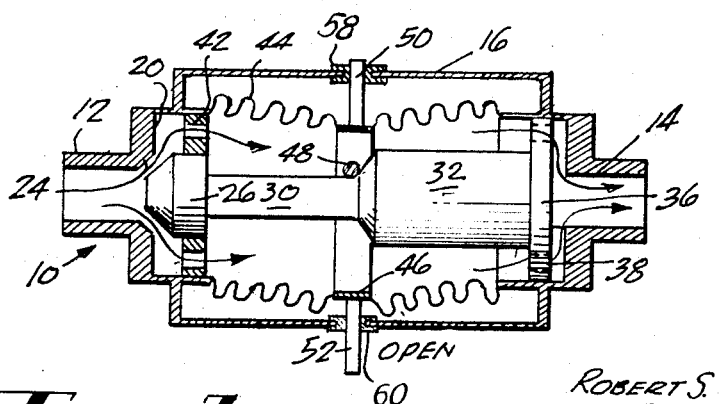
Figure 4:
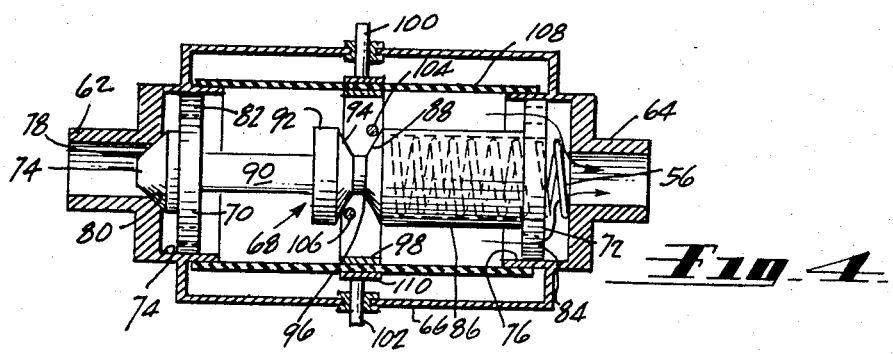
Figure 5:
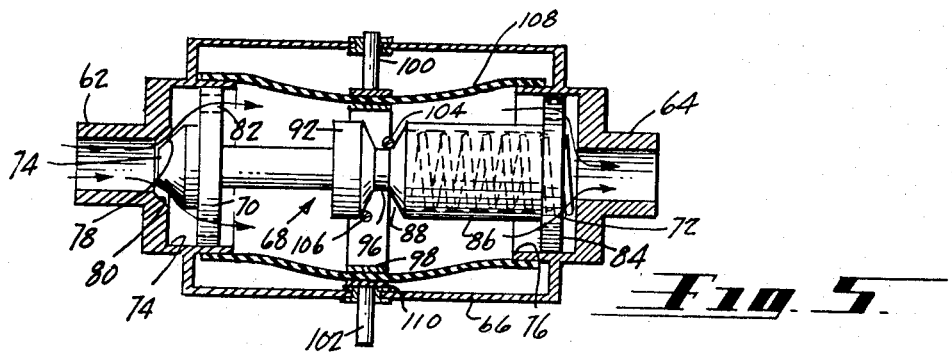
Figure 6:
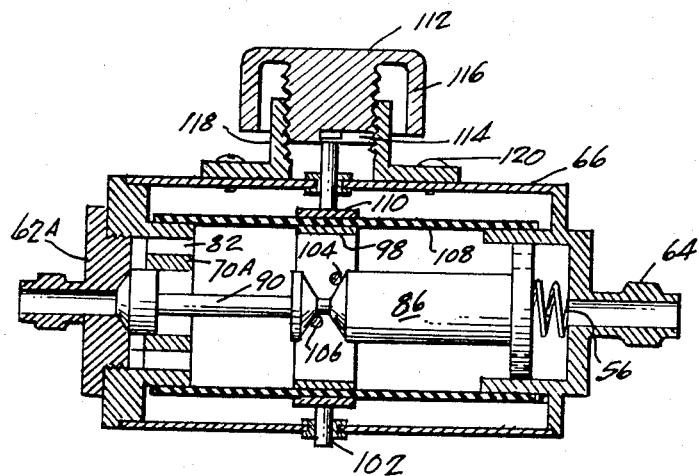

In accordance with the principles of the present invention, the valve poppet is isolated from its control device by the use of a bellows or flexible member section within the valve housing. This makes the use of seals around a moving member protruding into the fluid path within the valve housing no longer necessary. The valve assembly comprising the present invention has two basic separable parts, the body or housing, and the valve poppet. In those modifications where a return spring is included, this is a separable part, also. For a more complete and clear understanding of this invention, reference is now made to the drawings wherein:

FIGURE 1 is a sectional view taken in perspective, with parts cut away to more clearly show the operation of the valve, FIG. 2 is a schematic representation of the valve in its closed position, FIG. 3 is a schematic representation of the valve in open position, FIG. 4 is a schematic representation of a dual-action isolated poppet valve in closed position, FIG. 5 is a schematic representation of the valve in open position, and FIG. 6 is a cross-sectional view of another embodiment.

Reference is now made to FIG. 1 wherein there is shown housing 10 having end pieces 12 and 14 which serve as the attaching interface to the fluid flow system to be controlled by the valve. These end pieces are interconnected by an external casing 16. Poppet 18 is adapted to move longitudinally between ends 12 and 14 to control fluid flow through the valve. End 12 has a seat portion 20 having a beveled shoulder 22 against which a matching beveled shoulder 24 of poppet valve head 26 may be seated in completely closing end 12 to prevent further fluid flow. The valve poppet 18 consists of the head 26, spool 30 and an enlarged spring casing 32 connected to the spool 30 through an inclined surface 34. Spring casing 32 is cylindrical in shape and is hollow to permit the insertion therein of a spring 56 which tends to urge the poppet valve head 26 into contact with seat 22 of the valve.

Extending radially outwardly from the outer end of the spring casing 32 is a diaphragm 36 having openings 38 extending therethrough. This diaphragm 36 serves as a guide during the longitudinal movement of the poppet 18. Inwardly of beveled shoulder 22 and serving as a guide for valve head 26 is another annular diaphragm 40. This diaphragm also has openings 42 through which fluid may pass when valve head 26 is in open position and the beveled shoulder 24 of the valve head is not in engagement with the corresponding beveled shoulder 22 of valve seat 20.

Interconnecting ends 12 and 14 and spaced around poppet valve 18 is a deformable conductor such as a metallic corrugated cylinder 44. Affixed to this deformable conductor 44 is a collar 46 having an inwardly directed poppet drive pin 48 attached thereto. This collar 46 and pin 48 is so positioned that pin 48 abuts against the outer edge of inclined surface 34 when the inclined surface 24 of poppet head 26 is in abutment with shoulder 22 of seat 20. The flexibility of conductor 44 permits deflection thereof for the purpose of inwardly moving drive pin 48 along the inclined surface 34 to thus impart a lateral movement of the poppet 18. This opens the valve and frees the surface 24 of valve head 26 from contact with the beveled shoulder 22 of seat 20. Lateral deflection of the conductor 44 thus causes longitudinal movement of the poppet between its open and closed position.

Connected to the collar 46 is a push rod 50 on one side of the collar and a corresponding guide pin 52 of the other. Push rod 50 and guide pin 52 extends out through the casing 16. A suitable hand valve attachment 54 is connected to push rod 50 for actuation thereof.

Reference is now made to the schematic representations of the valve shown in FIG. 2 in closed position, and in FIG. 3 in open position. As shown in FIG. 2, the flexible member 44 is in its normal straight interconnecting position between the ends 12 and 14. Push rods 46 and guide pin 52 both extend through casing 16 in symmetrical fashion. This places the poppet drive pin 48 near the top of the inclined surface 34. Poppet 18 is urged toward the left by the return spring 56 positioned within the cylindrical housing 32.

FIG. 3 is a schematic illustration of the poppet valve after force has been applied to push rod 50 and the portion of the deformable conductor 44 adjacent the collar 46 has been downwardly deflected. This downward deflection urges pin 48 inwardly, down the incline surface 34. This in turn urges poppet 18 to move to the right, causing the beveled shoulder 24 of valve head 26 to become spaced from the beveled shoulder 22 of the valve seat 20. This, then, provides flow communication between ends 12 and 14. It is noted that in the opening and closing of this valve, no part communicating with the fluid path also protrudes out through the housing 16 within a seal and moves relative thereto to provide a potential leak path. The guides 58, 60 for rod 50 and rod 52 and the casing 16 need not be fluid tight.

FIGURES 4 and 5 are schematic illustrations of a modified form of poppet valve. FIG. 4 shows the valve in closed position. This valve in many respects is similar to that shown in FIGURES 1, 2 and 3, in that it has an inlet 62, outlet 64, external casing 66. A poppet 68 moves longitudinally between the ends and is positioned by diaphragms 70, 72 reciprocating on guides 74, 76. The head 78 of poppet 68 is tapered to fit against inlet shoulder 80. Diaphragm 70 in this modification is a part of poppet 68. Openings 82 permit fluid flow through diaphragm 70 when the valve is in open position as shown in FIG. 5. Openings 84 in diaphragm 72 permit fluid passage therethrough.

The spring casing 86 with its inwardly tapered inner surface 88 and spool 90 are similar in appearance as their counterparts in the first embodiment. In this modification, however, a dual action is provided wherein spool 90 terminates in an enlarged cylindrical portion 92 having an annular bevel 94 corresponding in appearance and function with the beveled surface 88. A crotch section 96 separates the two beveled portions. Collar 98 is adapted for lateral movement within casing 66 by means of push rods 100 and 102. Collar 98, in this modification, has two inwardly directed drive pins, 104, 106. These pins are mounted in such a manner that, in the closed position shown in FIG. 4, the pin 104 abuts tapered surface 88 near its outermost portion whereas pin 106 abuts annular bevel 94 at its innermost portion. The flexible member 108 interconnecting ends 62, 64 in a sealed relationship within the housing 66 may be of a resilient metal, rubber tubing or plastic material that has the necessary flexibility to permit lateral movement of collar 98. An outer collar, 110, fits over the resilient member 108 which in turn is over collar 98. The actuating pins 100 and 102 are connected to this outer collar so that the pins 104, 106 may be actuated by the actuating pins without having a direct connection therebetween that may be source of potential leakage. Pin 102 may be connected to a closure device whereas pin 100 is connected to an opening device through actuating means not shown. The opening and closing actuating also may be on one pin, if desired. It thus is possible to provide for a positive actuation to fully or partially open the valve as needed. This actuating means, not shown, may be a simple hand-operated attachment or it may be a remote, automatically operated device actuated in response to certain conditions to which it is desired that the valve would respond.

Reference is now made to FIG. 6 wherein a cross-sectional view of an isolated dual action poppet valve is shown. Because of the similarity in parts, with those shown in the schematic illustrations of FIGURES 4 and 5, like numbers identify like parts. The structure in FIG. 6 differs from the schematic illustrations in FIGURES 4 and 5, however, in that the diaphragm 70A with its apertures 82 are a part of end 62A instead of forming part of the valve head 78A. Pin 100 is connected to a hand valve control 112 which may be used to regulate the inward depression of the pin 100 to control the amount of fluid flow. The upper end of pin 100 is fashioned in a T-slot configuration and fits into such a T-shaped slot 114 in handle 112. In this manner, an in or out movement of slot 114 of handle 112 will cause transverse movement of pin 100 and longitudinal movement of poppet valve 68.

Handle 112 consists of a hand engaging portion 116 for rotation thereof. The handle has a threaded connection with mounting 118 which is removably secured to casing 66 such as by means of screws 120. This hand valve control may be removed, if desired, and a remote control or automatic movement device may be used instead. It should be noted that in this inner change of controls there is no breaking into the housing 66.

While the foregoing description of the various embodiments is for purposes of illustration only, and is not intended to limit the scope of the invention, it is to be understood that other modifications and variations in structure are contemplated and are within the purview of those skilled in the art. It is to be understood that the scope of this invention is to be determined by a reasonable interpretation of the appended claims.

What is claimed is:

1. A valve with an isolated valve actuating mechanism comprising:
    an inlet having a fluid communicating opening,
    an outlet having a fluid communicating opening,
    a housing interconnecting said inlet and said outlet,
    a fluid conductor within said housing interconnecting said inlet and outlet in fluid tight relationship, said conductor having depressible walls,
    said valve having a seat,
    a poppet within said conductor,
    said poppet having a head engageable with said seat to block fluid passage therebetween, and
    means connected to said conductor whereby lateral deflection of said conductor causes longitudinal movement of said poppet between engagement and disengagement with said seat.

2. A valve with an isolated valve actuating mechanism comprising:
    an inlet having a fluid communicating opening,
    an outlet having a fluid communicating opening,
    a housing interconnecting said inlet and said outlet,
    a fluid conductor within said housing interconnecting said inlet and outlet in fluid tight relationship, said conductor having depressible walls,
    said valve having a seat,
    a poppet within said conductor,
    said poppet having a head engageable with said seat to block fluid passage therebetween,
    said poppet having a radially tapering inclined surface thereon, and
    means connected to said conductor whereby lateral deflection of said conductor causes radial movement of said means against said tapered surface, resulting in longitudinal movement of said poppet.

3. A valve with an isolated valve actuating mechanism comprising:
    an inlet having a fluid communicating opening,
    an outlet having a fluid communicating opening,
    a housing interconnecting said inlet and said outlet,
    a fluid conductor within said housing interconnecting said inlet and outlet in fluid tight relationship, said conductor having depressible walls,
    said inlet having a seat,
    a poppet within said conductor,
    said poppet having a radially tapered head engageable with said seat to block fluid passage therethrough,
    said poppet having a radially tapering inclined surface thereon,
    means connected to said conductor whereby lateral deflection of said conductor causes radial movement of said means against said radially tapering inclined surface, resulting in longitudinal movement of said poppet, and
    spring means urging said head into engagement with said seat.

4. A valve within an isolated valve actuating mechanism comprising:
    an inlet having a fluid communicating opening,
    an outlet having a fluid communicating opening,
    a housing interconnecting said inlet and said outlet,
    a fluid conductor within said housing interconnecting said inlet and outlet in fluid tight relationship, said conductor having depressible walls,
said inlet having a seat,
a poppet within said conductor,
said poppet having a radially tapered head engageable with said seat to block fluid passage therethrough,
said poppet having a pair of opposed radially tapering inclined surfaces thereon, and
means connected to said conductor whereby lateral deflection of said conductor in one direction causes radial movement of said means against one of said tapered surfaces, resulting in longitudinal movement of said poppet in one direction and whereby lateral deflection in another direction causes radial movement of said means against the other of said surfaces, resulting in longitudinal movement of said poppet in another direction.

5. A valve with an isolated valve actuating mechanism comprising:
an inlet having a fluid communicating opening,
an outlet having a fluid communicating opening,
a housing interconnecting said inlet and said outlet,
a fluid conductor within said housing interconnecting said inlet and outlet in fluid tight relationship, said conductor having depressible walls,
a poppet within said conductor, and
connecting means connecting said conductor with said poppet whereby lateral deflection of said conductor causes longitudinal movement of said poppet to thereby open and close said valve,
said connecting means including an outer collar having a push rod affixed thereto and an inner collar within said conductor having a drive pin affixed thereto.

6. A valve with an isolated valve actuating means comprising:
an inlet having a fluid communicating opening,
an outlet having a fluid communicating opening,
a housing interconnecting said inlet and said outlet,
a fluid conductor within said housing connecting said inlet and outlet in fluid tight relationship, said conductor having depressible walls,
a poppet within said conductor,
said poppet having a radially tapering inclined surface thereon,
connecting means connecting said conductor with said poppet whereby lateral deflection of said conductor causes radial movement of said means against said tapered surface, resulting in longitudinal movement of said poppet,
said connecting means including an inner collar having a drive pin affixed thereto for engagement with said tapered surface and an outer collar having a push rod affixed thereto.

References Cited

UNITED STATES PATENTS

| | | | |
|---|---|---|---|
| 202,982 | 4/1878 | Bliss | 251—342 XR |
| 1,593,122 | 7/1926 | Hallstead | 251—257 XR |
| 2,121,354 | 6/1938 | Johnson | 251—342 XR |
| 2,779,564 | 1/1957 | Press | 251—257 |

HENRY T. KLINKSIEK, *Primary Examiner.*

U.S. Cl. X.R.

251—342